UNITED STATES PATENT OFFICE

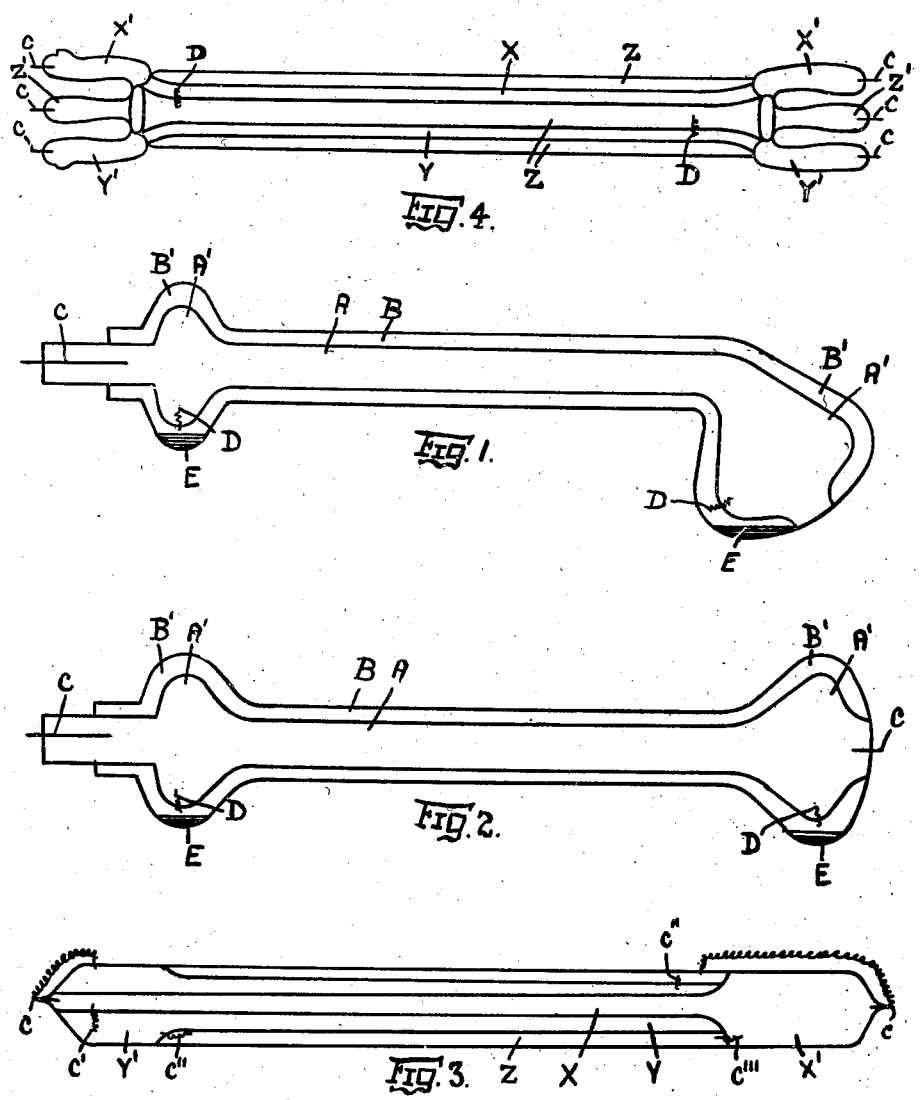

JAMES ROBERT ROBERTSON, OF LONDON, ENGLAND

VACUUM TUBE DEVICE

Application filed January 11, 1928, Serial No. 246,056, and in Great Britain January 22, 1927.

This invention relates to improvements in or relating to vacuum tube devices. Among the objects of the invention are to obtain an improved vacuum tube for therapeutic purposes or for use in converting electrical oscillations into light oscillations, for sound recording purposes, for example, and the improved tube has other fields of application also.

In one aspect the improvement in the tube is effected by making a composite tube comprising two or more tubes each containing a gas, one of said tubes at least having an electrode or electrodes which enable a current to be passed through the gas therein from an outside source, and with one or more electrodes extending from within one of the tubes into another of the tubes and not adapted to be connected to any outside source of current.

The invention is illustrated in the accompanying drawings, in which are shown sectional elevations of four different embodiments of the invention.

In Fig. 1 an inner tube A, furnished at either end with expansion chambers A', is sealed at its ends into an outer tube B, having expansion chambers B'. The tubes may be of quartz or glass. At one end of the tube A is an electrode C adapted to be connected to an outside source of current, and in this construction the capacity between the tube and earth is relied on for the passing of a current through the gas (nitrogen, neon, or a mixture of the two) contained in the tube A. The tube B likewise contains gas which may be of a similar nature to that in tube A. In both tubes moreover is a given quantity of hydrogen. Between the tubes A and B extend additional electrodes D, sealed in the tube A, and made of platinum or other substance which will permit of the passage of hydrogen from one tube to the other when the passing of a current heats these electrodes and when with use the pressure of the hydrogen in the latter tube drops below that in the former. In this construction of tube a small quantity of mercury E is held in the expansion chambers B' of the outer tube. This form of tube may be used for therapeutic purposes or massage. I have found that the mercury vapour in the outer tube B is caused to glow by induction from current passing through the inner tube A. The electrodes D permit of inter-communication of the electro-conductive gases in the two tubes A and B, and both the tubes are thus wired for an electric circuit and the current has more than one path open to it, if one of the tubes tends to become hard.

When by induction the mercury vapour becomes luminous, the electro-conductivity "softness" of both of the tubes becomes approximately the same, current freely passing directly through either chamber, until one of them becomes hard, when hydrogen gas from the softer chamber will pass through the electrodes intercommunicating with each tube, though excluding other gases from passing through. The said tubes are made of glass, permitting the emission of ultra violet rays, or of glass only permitting the emission of invisible rays. Because of the greater electro-conductivity of the rarefied gas in the central tube, the said tube is excited to luminescence, rich in actinic rays, by a high frequency coil on a lower current consumption than former types of mercury vapour tubes.

In Fig. 2 is shown a similar construction to that shown in Fig. 1, except that an electrode C for the outside source of current is furnished at both ends of the tube A.

In Fig. 3 is shown a tube without mercury and here the inner tube X has an expansion chamber X', and on to the ends of tube X is sealed a similar tube Y with expansion chamber Y' and outside the tube Y is a third tube Z. Electrodes C are provided at each end of the tube X for connection to an outside source of current and these electrodes also connect with the interior of the outer tube Z. Between the tubes X and Y is an electrode C', between the tubes Y and Z are electrodes C'', and between tubes X and Z is an electrode C'''. All the tubes are thus interconnected by electrodes, not connected directly with the electrodes C which permit of the passage from one tube to another of the hydrogen in the tubes.

In Fig. 4 there are two inner tubes X and Y lying within an outer tube Z, each tube having at either end expansion chambers X', Y', Z', and at either end electrodes C for connection in common to an outside source of current.

The inner tubes in any of these constructions may contain or be coated with zinc sulphide or other radio-active substance, in known manner, which when heated gives off radio-active particles that act on the gas contained in the outer tube and by "softening" it provide a bridge which assists the passing of a current through the outer tube and the vaporizing of the mercury, if such is present.

The effect of the hydrogen in the several tubes being able to pass from one tube to another may be said to have a regenerative action on the tube as a whole, and the life of the tube is lengthened, as it does not so soon become exhausted and have to be recharged with rarified gas.

It is known that compositions of uranium give off spontaneously radiations, and that radio-active substances are used in ordinary Geissler vacuum tubes, but I have found that by passing a current of electricity through one of the inner chambers of a compound vacuum tube made of glass in which is incorporated a radio-active substance or on which a radio-active substance is painted and when a suitable electric potential is applied, the stream of electrons so caused collides with, and disrupts, some of the atoms of gas. These energized gas atoms thus illumine the outer chamber of the said tube by induction when the current is passed through the inner chamber, and vice versa. Moreover, when the compound vacuum tube is charged with helium gas, the electronic stream passing through the tube increases the emission of alpha particles (helium gas atoms) from the radio-active substance in or on the glass. Thus released, these helium gas atoms help to maintain the softness and the life of the tube and make the tube self-regenerative, for it is known that helium is generated in direct ratio as the emission of radium disappears.

The several tubes may contain gases adapted to give different colours upon the passing of a current.

What I claim is:

1. A compound vacuum tube comprising a plurality of tubes sealed one within another wherein an inner tube is of such nature that, when warmed, it gives off radio-active particles which act upon the gas contained in another of the tubes.

2. A compound vacuum tube comprising a plurality of tubes sealed from one another and each containing a gas, an electrode in one of said tubes adapted to be connected to an outside source of current, and an inter-tube electrode not connected directly with any outside source of current and extending from within one of said tubes into another of said tubes, said inter-tube electrode being composed of a substance which will permit gas to pass from one tube to another.

3. A compound vacuum tube as claimed in claim 2, wherein the inter-tube electrodes are made of platinum.

4. A compound vacuum tube as claimed in claim 2, wherein the tubes contain hydrogen and nitrogen.

5. A compound vacuum tube as claimed in claim 2, wherein the tubes contain hydrogen and neon.

6. A compound vacuum tube as claimed in claim 2, wherein the several tubes contain gases adapted to give respectively different colours on the passing of a gas through them.

7. A compound vacuum tube as claimed in claim 2, wherein one of the tubes contains mercury.

8. A compound vacuum tube as claimed in claim 2, wherein one tube is sealed at its ends outside another tube and the inner tube has in at least one end an electrode adapted to be connected to the outside source of current.

9. A compound vacuum tube as claimed in claim 2, wherein one tube contains the remaining tubes of the composite tube and is sealed at its ends upon the other tubes.

10. A compound vacuum tube as claimed in claim 2, wherein at least one of the tubes is provided with an expansion chamber.

11. A compound vacuum tube comprising a plurality of tubes sealed from one another and each containing a gas, an inter-tube electrode extending from within one of said tubes into another of said tubes, said inter-tube electrode being composed of a substance which will permit gas to pass from one tube to another.

12. A compound vacuum tube comprising a plurality of tubes sealed from one another and each containing a gas, electrodes in a plurality of said tubes, adapted to be connected directly to an outside source of current, and inter-tube electrodes, not connected directly with an outside source of current, connecting the gases in a plurality of said tubes, said inter-tube electrodes being composed of a substance which will permit gas to pass between the tubes.

13. A compound vacuum tube as claimed in claim 2, wherein the tubes contain hydrogen.

14. A compound vacuum tube as claimed in claim 2, wherein the tubes contain hydrogen and helium.

In testimony whereof I have signed my name to this specification.

JAMES ROBERT ROBERTSON.